US007874609B2

(12) United States Patent
Whinnery

(10) Patent No.: US 7,874,609 B2
(45) Date of Patent: Jan. 25, 2011

(54) SMOOTH UNLATCH SYSTEM AND METHOD

(75) Inventor: Joseph Whinnery, Marysville, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 119 days.

(21) Appl. No.: 12/262,251

(22) Filed: Oct. 31, 2008

(65) Prior Publication Data

US 2010/0107500 A1 May 6, 2010

(51) Int. Cl.
*B60J 5/06* (2006.01)

(52) U.S. Cl. ........................ 296/146.4; 49/279; 292/110

(58) Field of Classification Search .............. 296/146.4, 296/146.8, 155, 57.1; 49/324, 279, 260; 292/95, 110, 96, DIG. 4, DIG. 23, DIG. 44
See application file for complete search history.

(56) References Cited

U.S. PATENT DOCUMENTS

| | | | | |
|---|---|---|---|---|
| 5,448,856 | A | 9/1995 | Moore et al. | |
| 5,449,212 | A | 9/1995 | Seifert | |
| 5,531,498 | A | 7/1996 | Kowall | |
| 5,906,071 | A * | 5/1999 | Buchanan, Jr. ............... | 49/360 |
| 6,053,542 | A | 4/2000 | Ostrowski et al. | |
| 6,068,321 | A | 5/2000 | Ooms | |
| 6,217,097 | B1 | 4/2001 | Rogers, Jr. et al. | |
| 6,357,813 | B1 | 3/2002 | Vandeberghe et al. | |
| 6,994,390 | B2 | 2/2006 | Zagoroff | |
| 2001/0022049 | A1 * | 9/2001 | Clark et al. ................... | 49/360 |
| 2005/0017539 | A1 | 1/2005 | Ihashi et al. | |

* cited by examiner

*Primary Examiner*—Joseph D Pape
(74) *Attorney, Agent, or Firm*—Jason H. Foster; Kremblas & Foster

(57) ABSTRACT

A powered vehicle door system and method in which a motor-driven door opening and closing mechanism and a motor-driven latching mechanism cooperate to enable the door to open from a latched, fully-closed position with improved noise control and improved smoothness of operation. The door can be a tailgate or a swinging or sliding door, and the opening and closing mechanism is operative to place the door in an over-closed position, thus reducing or eliminating the inherent tension placed upon the latch from the compressive force of the seal interposed between the door and the door frame. Optionally, the door latching mechanism assists the door opening and closing mechanism in placing the door in the over-closed position.

16 Claims, 12 Drawing Sheets

SMOOTH UNLATCH SYSTEM AND METHOD

BACKGROUND OF THE INVENTION

1. Field of the Invention

This invention relates generally to the automatic power release and opening of the closed and latched tailgate of a vehicle. In particular, the invention relates to minimizing, or substantially eliminating, the uneven motion of the tailgate and the significantly audible "pop" or "snap" sound that is emitted when the tailgate is released by the latch preparatory to opening.

2. Description of the Related Art

Many vehicles, particularly sport utility vehicles (SUVs), and more particularly so-called luxury SUVs, employ a power rear tailgate that can be automatically opened and closed with, for example, a system comprising switches capable of initiating an action, microcontrollers capable of receiving signals from the switches, and motors capable of effecting the initiated action, such as closing and latching or unlatching and opening the tailgate, via the microcontrollers. For example, when the tailgate is in an open position and one desires to close and latch it, a switch is first closed to initiate the desired (closing) action. This switch may be located in the passenger compartment within reach of the driver. It may also be contained within a handheld wireless remote control device, usually attached to the vehicle ignition key, carried by the driver. The signal from the switch is then transmitted to motors which effect the closing of the tailgate. In an exemplary system, there are two motors, one that rotates the tailgate between the open and closed position and one that latches and unlatches the tailgate. The tailgate opening and closing means, comprising a tailgate actuator and a tailgate actuator arm, is secured to the body, or frame, of the vehicle and operatively connected to the tailgate. The latching means is also secured to the body of the vehicle and includes a latch which is adapted to engage a catch secured to the tailgate.

Further included is a compressible seal interposed between the tailgate and the tailgate frame and generally attached to the tailgate frame itself. When the tailgate is in the fully-closed position, the seal fills what would otherwise be gaps between the tailgate and the tailgate frame, thus helping to reduce entry of road and other external noise from the passenger compartment, inhibit rattles between the tailgate and the tailgate frame, and keep water, dust, and other unwanted matter from entering the vehicle.

Due to mechanical design considerations, particularly due to the elastic force exerted by the typical compressible seal, the tailgate actuator, or motor, and its associated mechanical system are generally not strong enough to close the tailgate from a nominally-closed position, where the tailgate is resting on a nominally-compressed seal, to a fully-closed position, where the seal is further compressed. When closing the tailgate, the latch actuator and latch system are employed to engage the catch and pull the tailgate into the latched, fully-closed position. Preparatory to opening the tailgate, the latch actuator then causes the latch to disengage from the catch. Unfortunately, this disengaging action, in which the catch slips from the confines of the latch, occurs quite suddenly because the engaged structures are under tension due to the compressed, elastic seal. This tension causes an undesirable loud "pop" or "snap" sound as the compressed seal exerts an opening force on the tailgate. Further, the opening motion of the tailgate appears uneven or abrupt. These events, especially with respect to a luxury vehicle, detract from the refined image such a vehicle should project.

Therefore, there is a need for a vehicle tailgate release and opening system that minimizes or reduces the loud popping sound and the sharp jerking motion currently associated with the opening of powered vehicle tailgates.

BRIEF SUMMARY OF THE INVENTION

It is an object of an exemplary embodiment of the present invention to provide a door release and opening system, the preferred embodiment of which comprises a vehicle having a body and a door, such as the tailgate, pivotably attached to the body. The tailgate includes a catch secured thereto. A tailgate frame is attached to the body and a tailgate opening and closing means is connected to the tailgate and to the body of the vehicle. A tailgate latching means is connected to the body of the vehicle. The latching means comprises a latch attached thereto, wherein the latch is adapted to engage the catch. An elastic, compressible seal is interposed between the tailgate and the tailgate frame. A first switch is operatively connected to the tailgate opening and closing means and a second switch is operatively connected to the tailgate latching means.

The tailgate is initially held by the latch engaged with the catch in a latched, fully-closed position, $P_F$. The subscript "F" herein denotes the fully-closed position. The tailgate is close to, and separated by a distance $S_F$ from, the frame, and the seal is compressed to full compression, $C_F$. As will be appreciated by those skilled in the art, the degree of "compression" refers to the amount of force by which the compressible seal is compressed. A first signal from the first switch to the tailgate opening and closing means is effective to cause the tailgate opening and closing means to apply a further closing force to the tailgate whereby the tailgate is urged to an over-closed position, $P_O$. The subscript "O" herein denotes the over-closed position. The separation distance between the tailgate and the frame is thus reduced to $S_O$, and the seal is further compressed to an over-closed compression, $C_O$. In a preferred embodiment, the further closing force is effected by powering the tailgate opening and closing means with a low-stall torque which is increased until terminal voltage (full $V_{BATT}$) is reached. Thus, the distance $S_F$ is greater than the distance $S_O$ and the compression $C_O$ is greater than the compression $C_F$ as the tailgate is urged closer to the vehicle body, from a fully-closed position to an over-closed position.

A second signal from the second switch to the tailgate latching means is effective to disengage the latch, now under reduced or no tension by the seal or other structure, from the catch. The tailgate is then unconstrained by the latch, and so long as the tailgate remains substantially at $P_O$, the separation distance remains at substantially $S_O$, and the seal compression remains at substantially $C_O$ due to the force applied by the tailgate opening and closing means. In a preferred embodiment, however, the power to the tailgate opening and closing means is subsequently reduced until the tailgate opening and closing means is unpowered. Optionally, a third signal from a third switch to the tailgate opening and closing means is effective to apply an opening force to the tailgate and the tailgate at least partially opens. Because the compressive force of the seal is at least partially overcome by the tailgate opening and closing means when the latch is disengaged from the catch, the popping sound and the sharp jerking motion upon release by the latching means is reduced or eliminated. The tailgate opening and closing means can thus smoothly open the tailgate to its fully-open position.

In a further embodiment, a fourth switch is in operative connection with the tailgate latching means and is operative to cause a fourth signal to be transmitted to the tailgate latching means effective to draw the tailgate from the fully-closed position, $P_F$, to the over-closed position, $P_O$. Thus, the tailgate latching means assists the tailgate opening and closing means in urging the tailgate from the fully-closed position, $P_F$, to the over-closed position, $P_O$.

In a further alternative embodiment for releasing and opening a tailgate of a vehicle, the tailgate is initially in a latched, fully-closed position, $P_F$, a first portion of the tailgate is close to, and separated by a distance $S_F$ from, a first portion of a tailgate frame, and the tailgate is compressing a compressible seal interposed between at least a portion of the tailgate and at least a portion of the frame to $C_F$. A signal is transmitted to a tailgate opening and closing means, whereby the tailgate is urged in a closed direction, to apply a closing force to the tailgate. The tailgate is thus urged in the closed direction to an over-closed position, $P_O$, the separation distance between the first portion of the tailgate and the first portion of the frame is reduced to $S_O$, and the seal is further compressed to $C_O$. A signal is also transmitted to a tailgate latching means to move the latch to the unlatched position, whereby the latch moves to the unlatched position and the tailgate is unconstrained by the latch. Thus, $S_N$ is greater than $S_F$ and $S_F$ is greater than $S_O$ and $C_O$ is greater than $C_F$ and $C_F$ is greater than $C_N$. The subscript "N" herein denotes the nominally-closed position. Optionally, a signal is also transmitted to the tailgate opening and closing means to open the tailgate, whereby the tailgate at least partially opens.

In a further alternative embodiment, the tailgate latching means is further operative to move the latch to draw the tailgate from the latched, fully-closed position, $P_F$, to the over-closed position, $P_O$, and is signaled to apply a drawing force to the tailgate, whereby the tailgate is further urged in the closing direction to the over-closed position, $P_O$. Thus, the tailgate latching means assists the tailgate opening and closing means in moving the tailgate from the fully-closed position, $P_F$, to the over-closed position, $P_O$.

In a further alternative embodiment, the signals are initiated from the passenger compartment of the vehicle. In a further alternative embodiment, the signals are initiated from a hand-held wireless transmitter.

In a further alternative embodiment, a signal is transmitted to a first actuator in operative connection with the tailgate of a vehicle, to apply a closing force to the tailgate in a first closed position, whereby the tailgate is urged to a second closed position. A signal is transmitted to a second actuator in operative connection with the tailgate latch, whereby the latch is moved from an engaged to a disengaged position. Additionally, a compressible seal may be interposed between at least a portion of the tailgate and at least a portion of the tailgate frame and, in the first closed position, the tailgate compresses the seal to $C_F$ and, in the second closed position, the tailgate compresses the seal to $C_O$ and $C_O$ is greater than $C_F$. Alternatively, a compressible seal is interposed between at least a portion of the tailgate and at least a portion of the tailgate frame and in the first closed position, a first portion of the tailgate is proximate to, and separated by a distance $S_F$ from, a first portion of the frame and in the second closed position, the separation distance between the first portion of the tailgate and the first portion of the frame is $S_O$ and $S_F$ is greater than $S_O$.

In a further alternative embodiment, a tailgate, having a catch secured thereto, is initially in a latched, fully-closed position, $P_F$, and held in the latched, fully-closed position, $P_F$, by a tailgate latch, the latch extendably operative to enable the tailgate to move between the latched, fully-closed position, $P_F$, and a nominally-closed position, $P_N$. The latch is operative to move between an engaged position and a disengaged position relative to the tailgate catch. In the latched, fully-closed position, $P_F$, the tailgate compresses a compressible seal interposed between at least a portion of the tailgate and at least a portion of the tailgate frame. The latch is extended, whereby the tailgate moves from the latched, fully-closed position, $P_F$, to the nominally-closed position, $P_O$, the distance from a first portion of the tailgate to a first portion of the tailgate frame increases from $S_F$ to $S_N$, the seal is decompressed from $C_F$ to $C_N$, $C_F$ is greater than $C_N$, and $S_N$ is greater than $S_F$. Subsequently, the latch is moved from the engaged position to the disengaged position and the tailgate is free to at least partially open.

Figure 2:
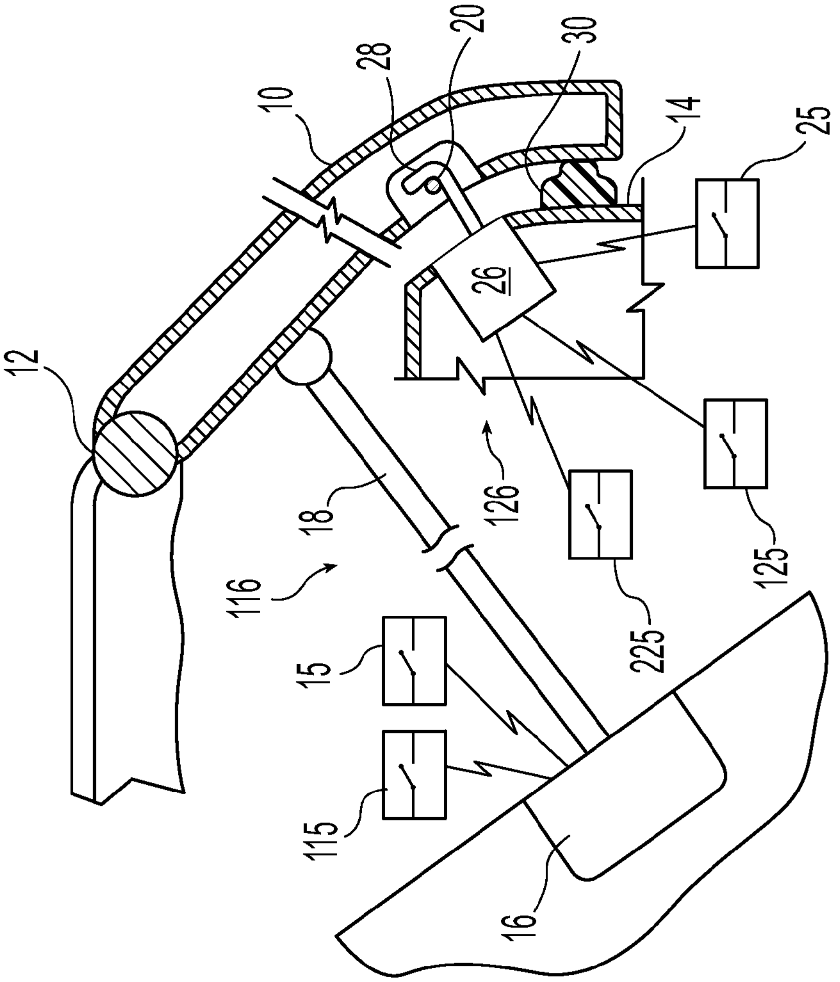
FIG. 2 is a partial cutaway side view illustrating the rear portion of the vehicle shown in FIG. 1 including a tailgate catch and a power latch mechanism.

In describing the various embodiments of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 1:
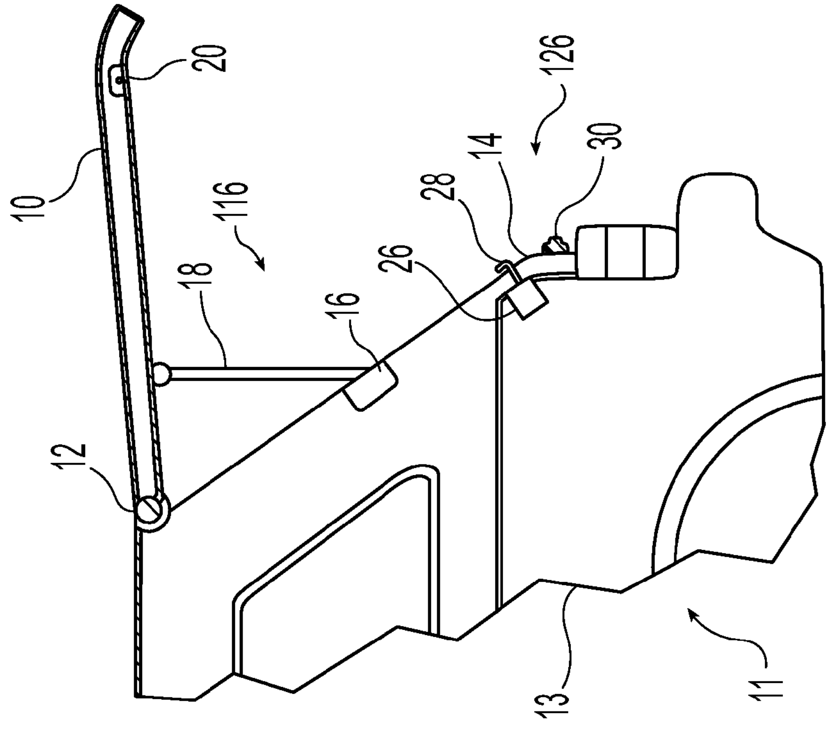
FIG. 1 is a side view illustrating a rear portion of a vehicle including a powered tailgate.

A power door system is shown in FIG. 1. In the invention, the term "door" is defined broadly to include any vehicle body closure that opens and/or closes under the power of prime movers, including, without limitation, electric motors and hydraulic/pneumatic rams. Thus, the term "door" includes, but is not limited to, sliding doors, doors that swing along a hinge, hinged tailgates and any other passenger compartment or cargo compartment body closure that is opened and/or closed under power, as opposed to completely manually.

A vehicle 11 comprises a body 13 and a tailgate 10 pivotably attached to the vehicle 11 at a hinge 12. A tailgate frame 14 is also part of the vehicle, as is a tailgate opening and closing means 116, comprising a tailgate actuator 16, such as a motor, and a tailgate actuator arm 18. The tailgate actuator arm 18 is preferably a conventional elongated, telescoping structure, possibly having teeth or threads formed in one or more ends thereof which engage with teeth or threads of a driven gear of the tailgate actuator 16. FIG. 2 further illustrates the exemplary power tailgate system shown in FIG. 1 and shows a catch 20, which can be a metal loop, as is conventional, secured to the tailgate 10. A tailgate latching means 126 comprises a latch actuator 26, such as a motor, and a clinch latch 28, which may be a hook or "L-shape", both of which are conventional. Also included is a compressible seal 30, generally attached to the tailgate frame 14, but optionally attached to the tailgate 10 itself and interposed between the tailgate 10 and the tailgate frame 14. The compressible seal 30 can be a conventional elastomeric automobile seal.

A first switch 15 (shown in FIG. 2) is operative to actuate the tailgate opening and closing means 116 to urge the tailgate 10 from a fully-closed position to an over-closed position. A third switch 115 is operative to actuate the tailgate opening and closing means 116 to urge the tailgate 10 to open, and is operatively connected to the tailgate opening and closing means 116. Also shown in FIG. 2 are a second switch 25, operative to actuate the latch actuator 26 to disengage the latch 28 from the catch 20 and a fourth switch 125, operative to actuate the latch actuator 26 to apply a drawing force to the latch 28. When the drawing force is applied, the tailgate 10 is drawn to the over-closed position. A fifth switch 225 is operatively connected to the tailgate latching means 126 and is operative to apply an extension force, which is in the opposite direction to the drawing force, to the latch 28.

A switch (not shown) controls the closing of the tailgate 10 via the tailgate opening and closing means 116 from a fully-open position. In operation, starting with the tailgate 10 in an open position allowing access to the interior of the vehicle 11 from outside the vehicle 11, the tailgate closing switch is closed and a signal is communicated to the tailgate actuator 16 to move the tailgate 10 to a closed position. As will be understood by those skilled in the art, the signal to close may be effected via a microcontroller (not shown) with which the tailgate closing switch is in operative connection. Alternatively, the switch may be included within the microprocessor and the closing action initiated with the closing of a single switch in a passenger compartment of the vehicle or from a hand-held wireless device such as a remote control.

Figure 3C:
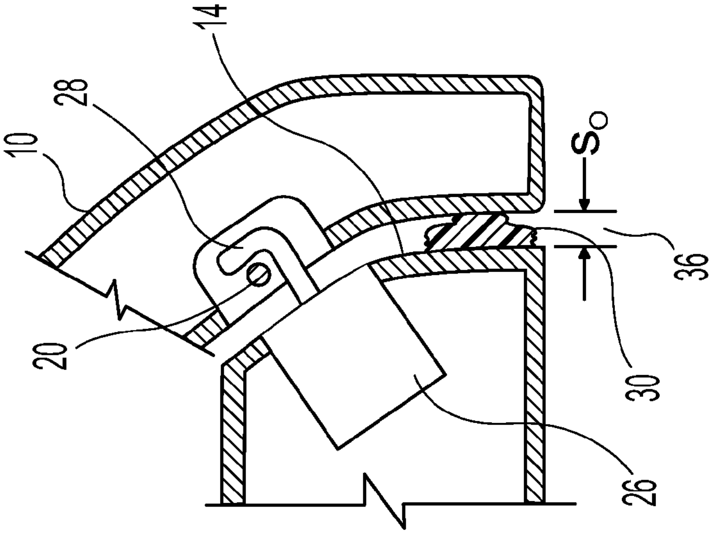
FIG. 3*c* is a partial cutaway side view illustrating the rear portion of the vehicle with the tailgate in an over-closed position.

Upon reaching a nominally-closed position, $P_N$, (FIG. 3*a*), the tailgate 10 rests on the seal 30, nominally applying a compressing force $C_N$ to the seal 30. The tailgate 10 is nominally separated from the tailgate frame 14 at a separation distance $S_N$ 32. The tailgate latching means 126 causes the latch 28 to engage with the catch 20. In this configuration, the tailgate 10 is latched, but the seal 30 is not yet significantly compressed. As will be appreciated by those skilled in the art, it is desirable not to provide power to the tailgate opening and closing means 116 sufficient to drive the tailgate 10 into a fully-closed and latched position, $P_F$, by itself. This can be, for example, because the tailgate opening and closing means 116 cannot provide the torque required. Therefore, the tailgate latching means 126 is operative to urge the tailgate 10 into the fully-closed position, $P_F$. As will be further appreciated by those skilled in the art, signals transmitted to the tailgate latching means 126 may also be effected via a microcontroller (not shown). As will be still further appreciated by those skilled in the art, the entire opening or closing step herein described may be initiated by a single physical switch and further switching effected by the microcontroller.

Figure 3B:
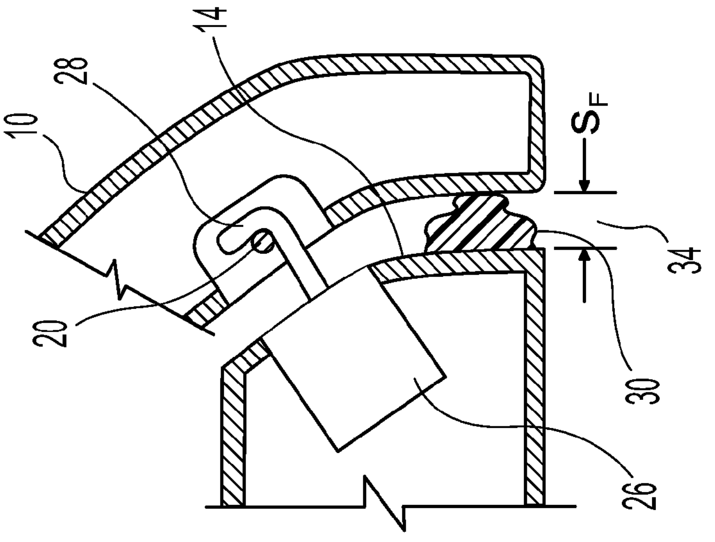
FIG. 3*b* is a partial cutaway side view illustrating the rear portion of the vehicle with the tailgate in a fully-closed position.
Figure 3A:
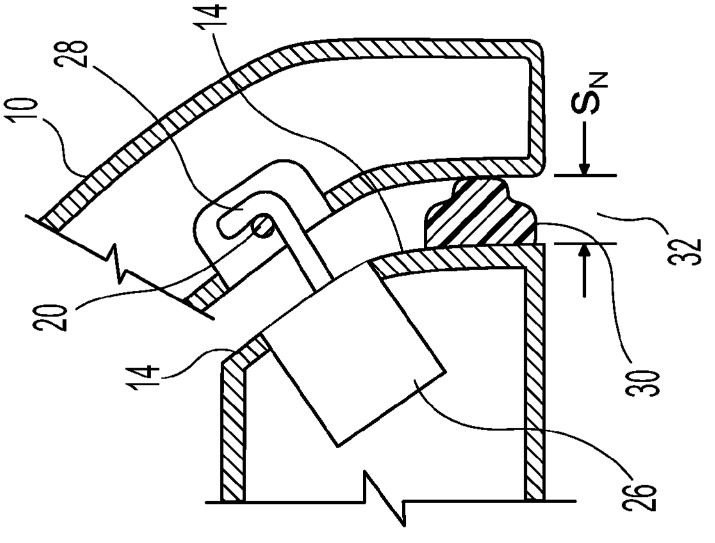
FIG. 3*a* is a partial cutaway side view illustrating the rear portion of the vehicle shown in FIGS. 1 and 2 including a compressible seal with the tailgate in a nominally-closed position.

When the tailgate latching means 126 urges the tailgate 10 toward the fully-closed position, $P_F$, from the nominally-closed position $P_N$ the latch 28, starting in an extended position, is drawn in a closing direction by the latch actuator 26. As the latch 28 is moved, it thereby draws the attached tailgate 10 from the nominally-closed position, $P_N$, (FIG. 3*a*) to the fully-closed and latched position, $P_F$, where the seal 30 is further compressed to $C_F$ and the tailgate 10 is separated from the tailgate frame 14 at a separation distance $S_F$ 34. (FIG. 3*b*.) The fully-compressed seal, $C_F$, and tailgate position, $P_F$, is the condition in which the seal 30 is compressed and maintained when the vehicle is in a condition to be driven. As will be appreciated by those skilled in the art, $C_F$ is greater than $C_N$ (greater compression force when fully closed) and $S_N$ is greater than $S_F$ (smaller gap when fully closed).

Figure 4A:
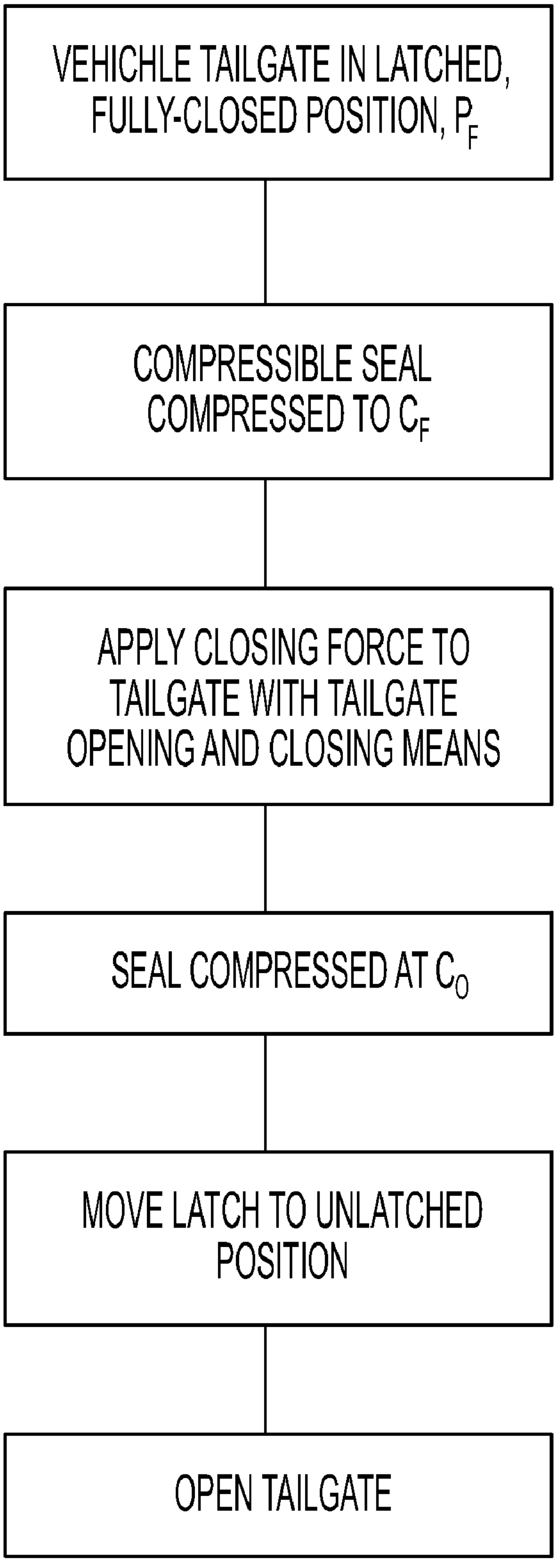
FIG. 4*a* is a flowchart illustrating the operation of an embodiment of the present invention.
Figure 6:
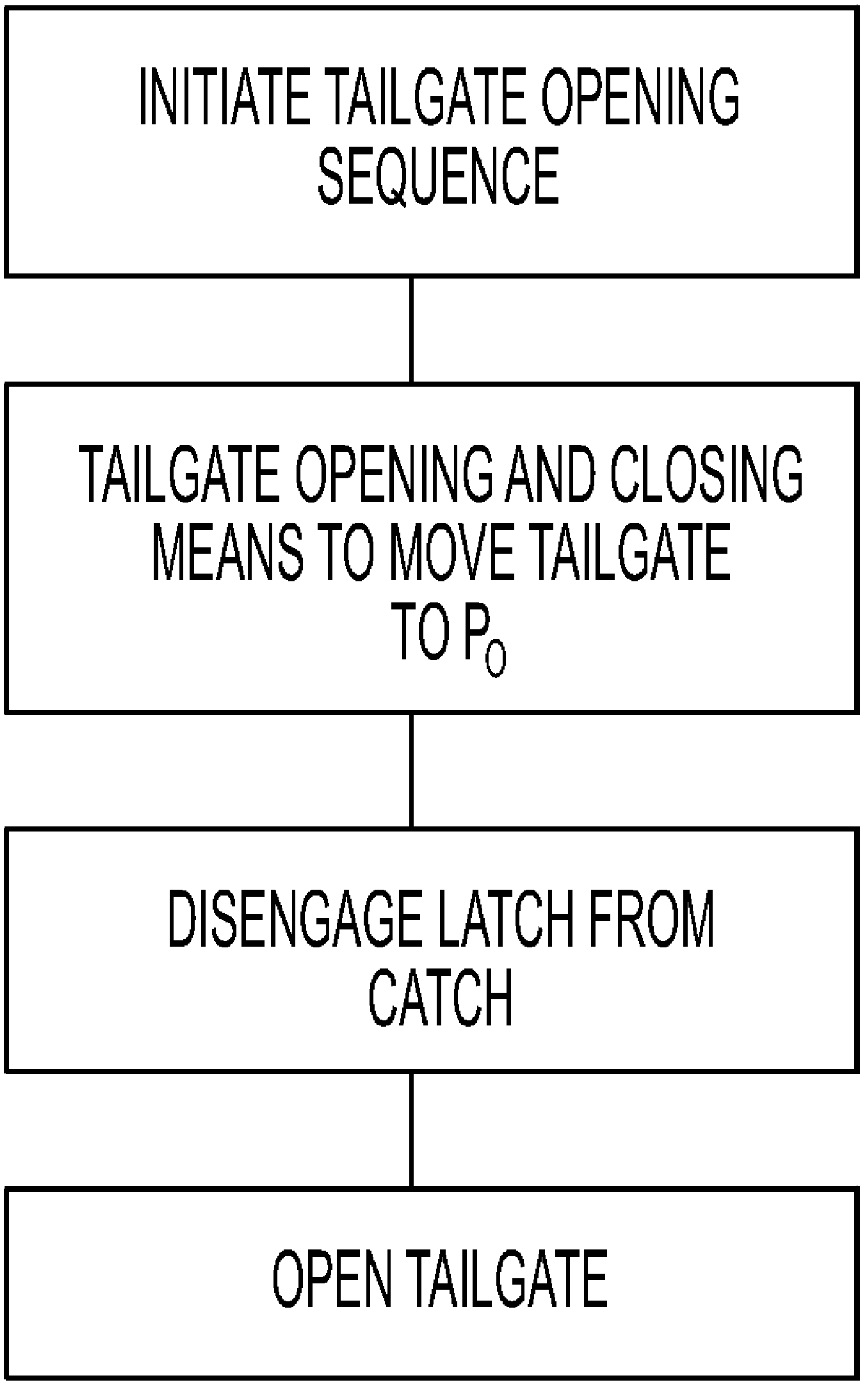
FIG. 6 is a flowchart illustrating the operation of an embodiment of the present invention.

When it is desired to open the tailgate 10 using a first embodiment of the invention, the first switch 15 is closed and the tailgate opening and closing means 116 urges the tailgate 10 from the fully-closed position with a separation distance of $S_F$ 34 and a seal compression of $C_F$ to an over-closed position, $P_O$, with a separation distance of $S_O$ 36 and a seal compression of $C_O$. (FIG. 3*c*.) The over-closed position, $P_O$, is accomplished by displacing the tailgate 10 to a closed position beyond the fully-closed position, $P_F$, to compress the seal 30 beyond the full-compressed state, $C_F$. As will be appreciated by those skilled in the art, $C_O$ is greater than $C_F$ and $S_F$ 34 is greater than $S_O$ 36. (FIGS. 3*b*, 3*c*, and 4*a*.) Once the over-closed position, $P_O$, is accomplished (shown in FIG. 3*c*), the latch 28 is released, such as by displacing the latch 28 laterally in a conventional manner to release the catch 20. At this point, the tailgate 10 has been moved beyond the fully-closed position, $P_F$, thereby releasing or reducing tension on the latch 28 from the elastic force of the compressed seal 30. Thus, when a signal from the second switch 25 causes the latch 28 to disengage from the catch 20, the undesirably loud "pop" or "snap" traditionally associated with such disengagement is reduced or eliminated. Additionally, the tailgate 10 does not make an uneven or abrupt motion. Once the latch 28 is disengaged, the tailgate 10 may then be opened by the tailgate opening and closing means 116, upon activation of the third switch 115 as described above, which is a smooth motion. (FIGS. 2 and 6.) Thus, the step of over-compressing the seal 30 prior to disengagement of the latch 28 eliminates or significantly reduces the audible and visible result of the sudden release of the potential energy of the compressed seal 30. The potential energy is instead released more gradually by the tailgate opening and closing means 116 releasing the compressive force on the seal 30.

Figure 4B:
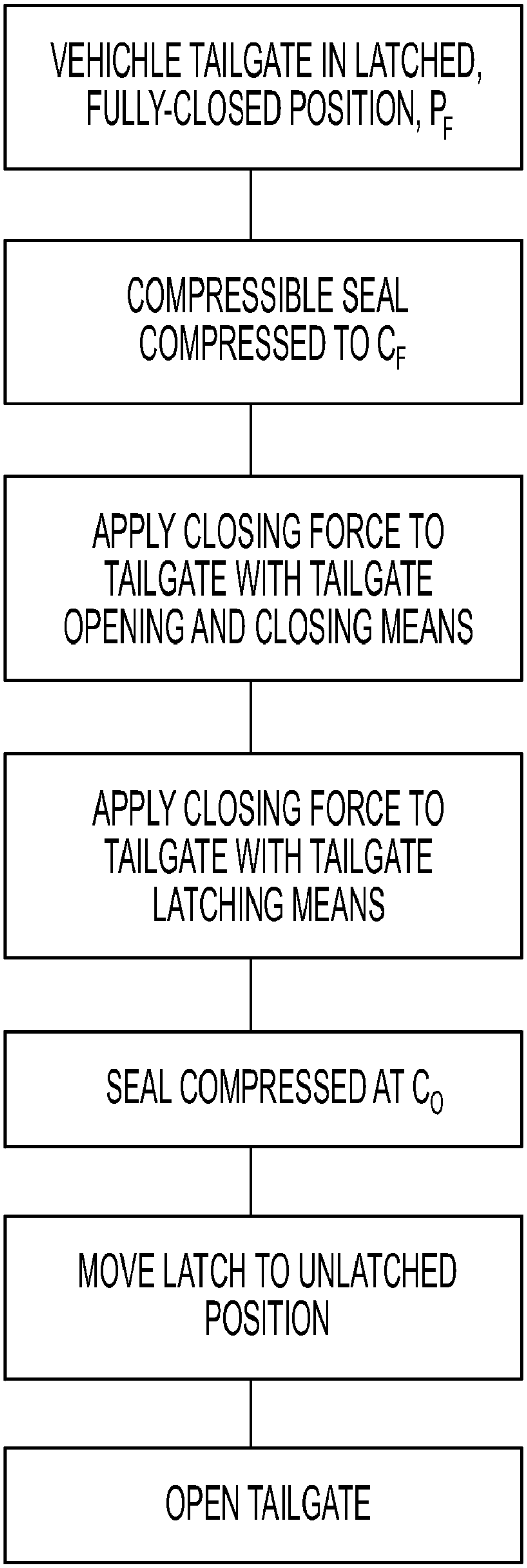
FIG. 4*b* is a flowchart illustrating the operation of an embodiment of the present invention.

The process described above is not the only method by which the potential energy of the compressed seal 30 may be gradually released. Turning now to FIG. 4*b*, again with the tailgate 10 in the fully-closed position seated on the seal 30, an alternate method is described. The tailgate 10 is separated from the tailgate frame 14 by a separation distance $S_F$ 34 and the seal 30 is fully compressed to $C_F$ 34 by the latch actuator 26. (FIG. 3*b*.) The first switch 15 is closed and the tailgate opening and closing means 116 urges the tailgate 10 from the fully-closed position with a separation distance $S_F$ 34 and a seal compression of $C_F$ to an over-closed position, $P_O$, with a separation distance of $S_O$ 36 and a seal compression of $C_O$.

Figure 7:
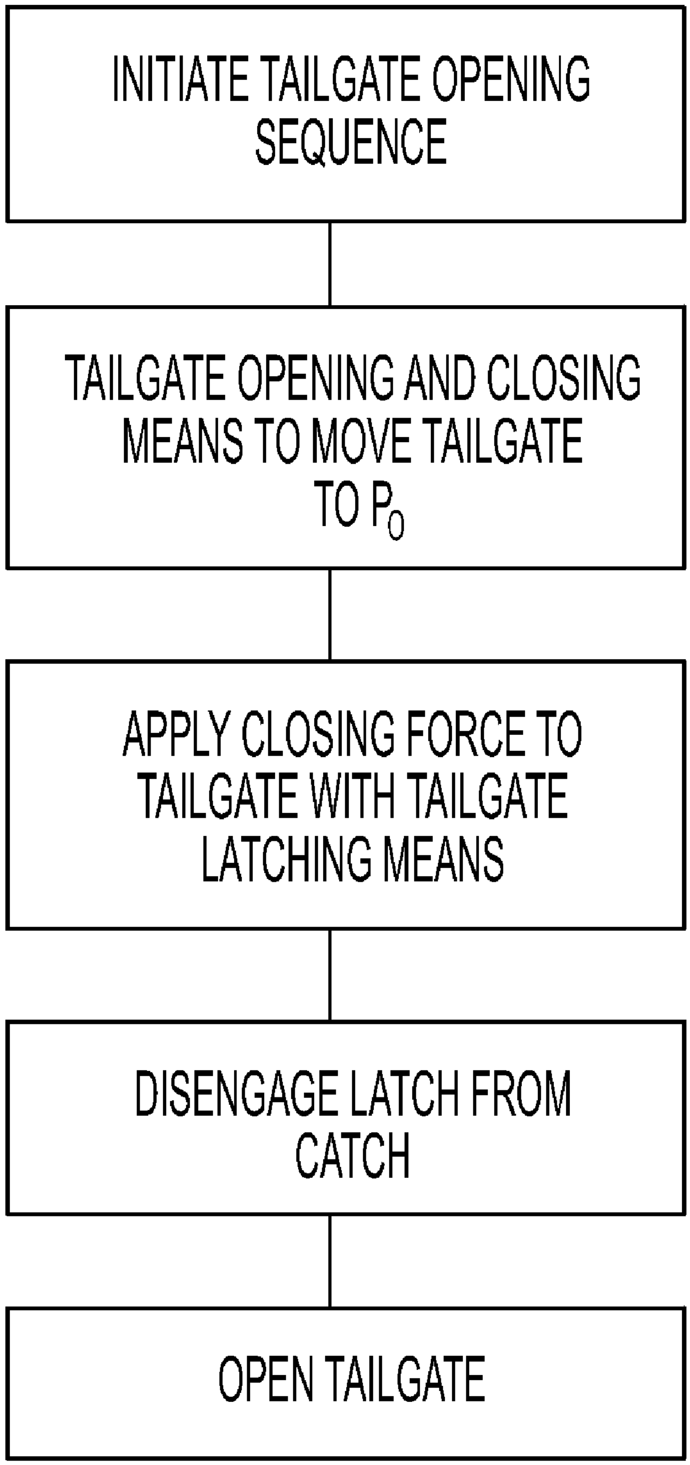
FIG. 7 is a flowchart illustrating the operation of an embodiment of the present invention.

(FIGS. 3*c* and 4*b*.) Additionally, the tailgate latching means 126, and in particular the latch actuator 26, is employed, via a signal from the fourth switch 125, to assist in moving the tailgate 10 from the fully-closed position to the over-closed position. (FIG. 4*b*.) In an alternative, the latch actuator 26 first over-compresses the seal 30, then the tailgate opening and closing means 116 applies a closing force to hold the tailgate 10 in the over-closed position, $P_O$. Tension on the latch 28 from the compressive force of the seal 30 is thus overcome or reduced such that when a signal from the second switch 25 causes the latch 28 to disengage from the catch 20, the undesirable loud "pop" or "snap" traditionally associated with such disengagement, is reduced or eliminated. Further, the tailgate 10 does not open in an uneven or abrupt motion. The tailgate 10 may then be smoothly fully opened upon activation of the third switch 115. (FIG. 7.) Additionally, via a signal from the fifth switch 225, the latch 28 may be extended before the signal is sent from the second switch 25 that causes the latch 28 to disengage from the catch 20. By extending the latch 28, which is movement of the latch 28 in the direction opposite to drawing of the latch 28, the distance between the latch 28 and the catch 20 is increased.

Figure 5:
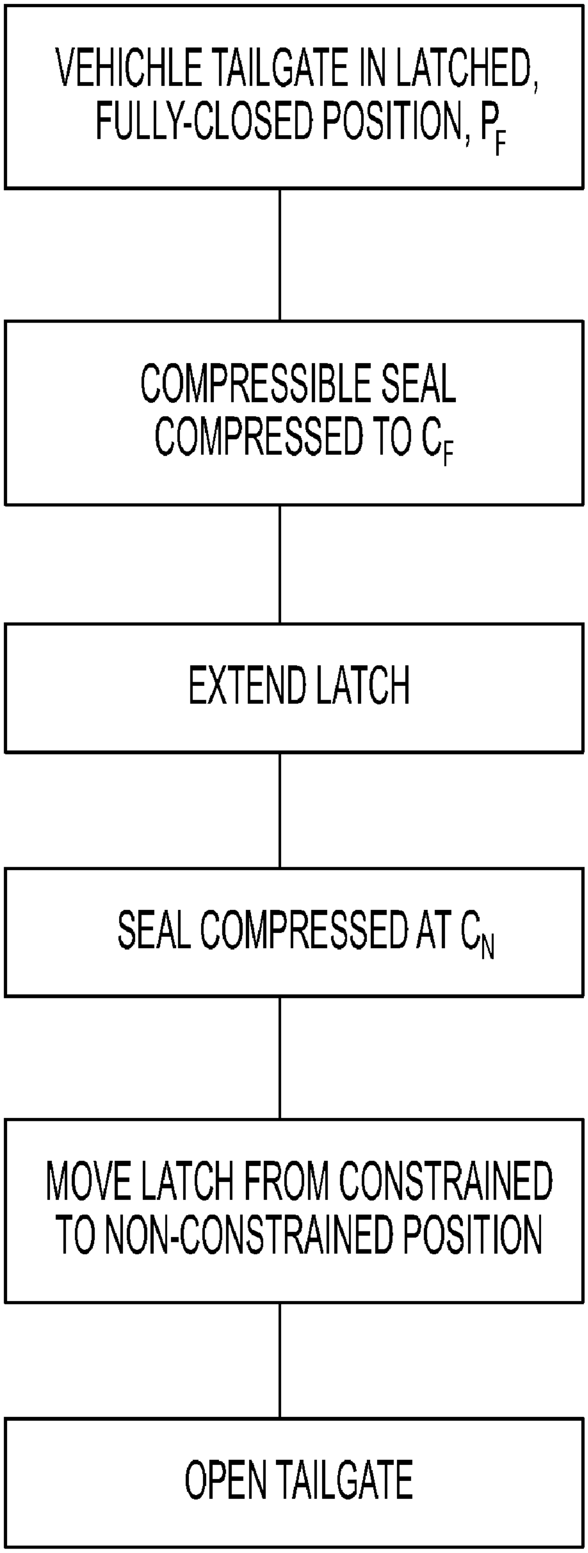
FIG. 5 is a flowchart illustrating the operation of an embodiment of the present invention.
Figure 8:
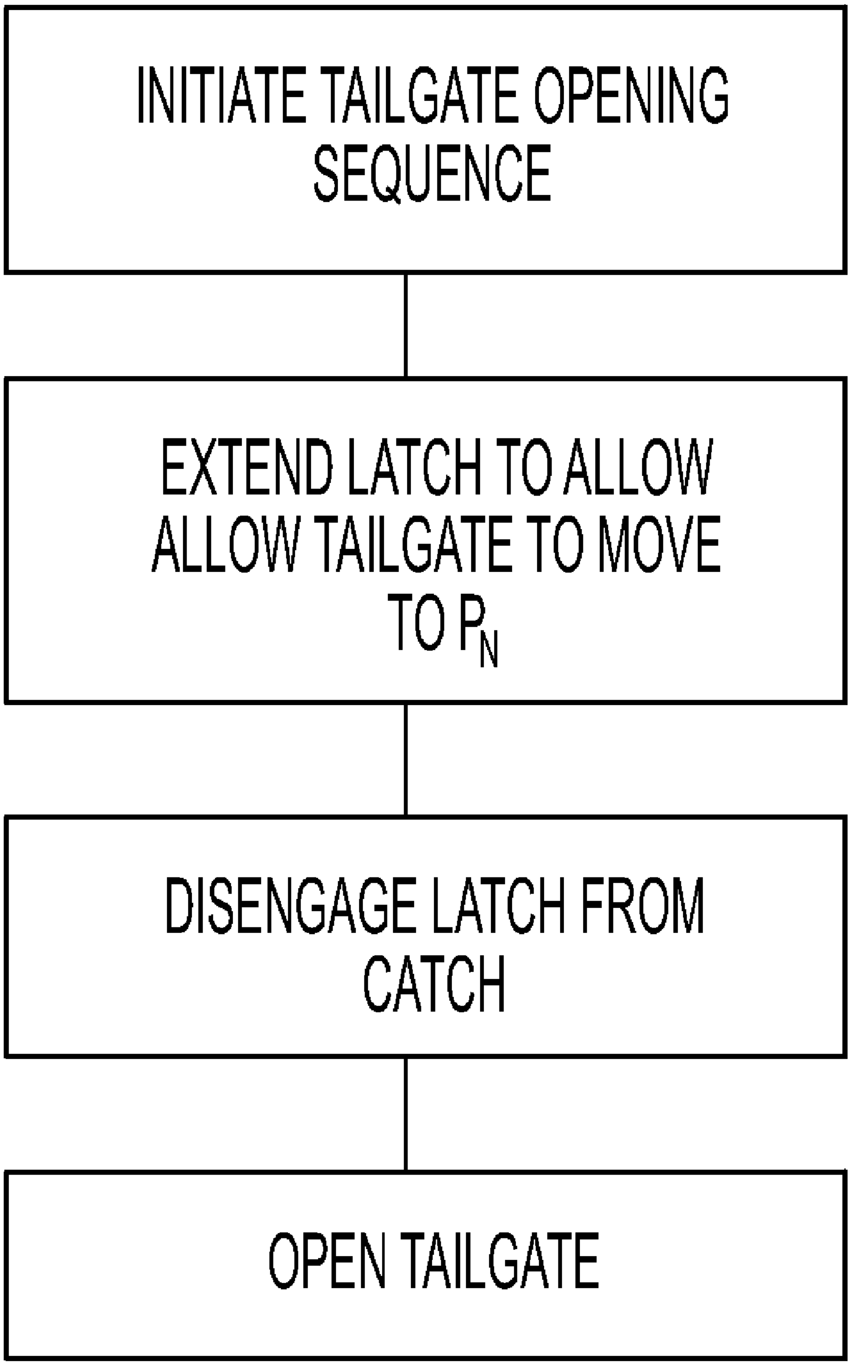
FIG. 8 is a flowchart illustrating the operation of an embodiment of the present invention.

Turning now to FIGS. 5 and 8, which illustrate a still further alternative embodiment, again with the tailgate 10 in the fully-closed position seated on the seal 30, the tailgate is separated from the tailgate frame 14 by a separation distance $S_F$ 34 and the seal is compressed to $C_F$. (FIG. 3*b*.) The fifth switch 225 is closed and the tailgate latching means 126 extends the latch 20 and allows the compressive force on the seal 30 to urge the tailgate 10 from the fully-closed position with a separation distance of $S_F$ 34 and a seal compression of $C_F$ to the nominally-closed position, $P_N$, with a separation distance $S_N$ 32 (FIG. 3*a*) and a seal compression of $C_N$. (FIGS. 5 and 8.) Tension on the latch 28 from the compressive force of the seal 30 is thus relaxed or reduced such that when a signal from the second switch 25 causes the latch 28 to disengage from the catch 20, the undesirable "pop" or "snap" traditionally associated with such disengagement is reduced or eliminated. Further, the tailgate 10 does not open in an uneven or abrupt motion. The tailgate 10 may then be smoothly opened upon activation of the third switch 115. (FIG. 8.)

Figure 9:
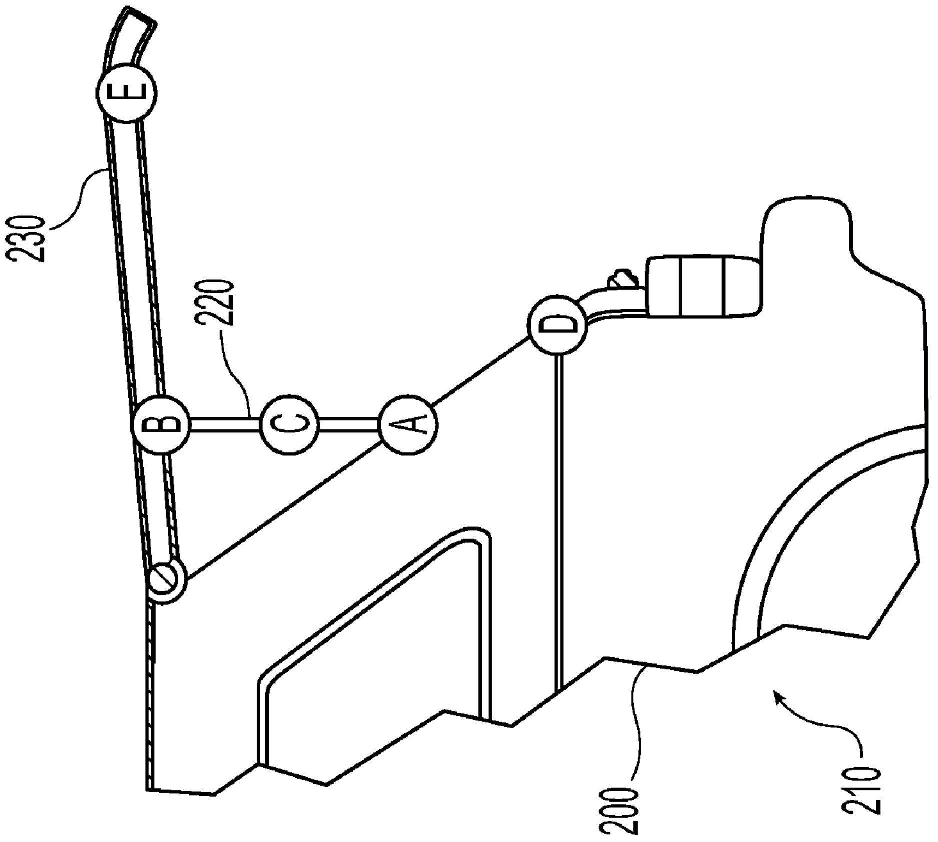
FIG. 9 is a side view illustrating a rear portion of the vehicle shown in FIG. 1 with alternative locations for the tailgate catch, latch, and opening/closing means.

Referring now to FIG. 9, the tailgate actuator (not shown) can be mounted to the body 200 of the vehicle 210 at location A, as in the embodiments of the invention described above, with the tailgate actuator arm 220 mounted to the tailgate 230 at location B. Alternatively, it is contemplated that the actuator can be mounted to the tailgate 230 at location B, with the tailgate actuator arm 220 mounted to the body 200 at location A. It is further contemplated the tailgate actuator can be mounted within the actuator arm 220, for example, at location C, with one end of the actuator arm 220 mounted to the body 200 at location A, and the opposite end of the arm 220 mounted to the tailgate 230 at location B. The alternative placements of the actuator can be applied to each of the above-described embodiments of the invention without substantively altering the function and interaction of the various component parts described.

Still referring to FIG. 9, it is similarly contemplated that both the latching means (not shown) and the catch (not shown) can be alternatively mounted to either the vehicle body 200 at location D, or to the tailgate 230 at location E. If the latching means is mounted to the body 200 at location D, the catch is mounted to the tailgate 230 at location E (as in the embodiments described above). Alternatively, if the latching means is mounted to the tailgate 230 at location E, the catch is mounted to the body 200 at location D. As with the alternative placements of the actuator, the alternative placement of the latching means and the catch can be applied to each of the above-described embodiments of the invention without substantively altering the function and interaction of the various component parts described.

Figure 11:
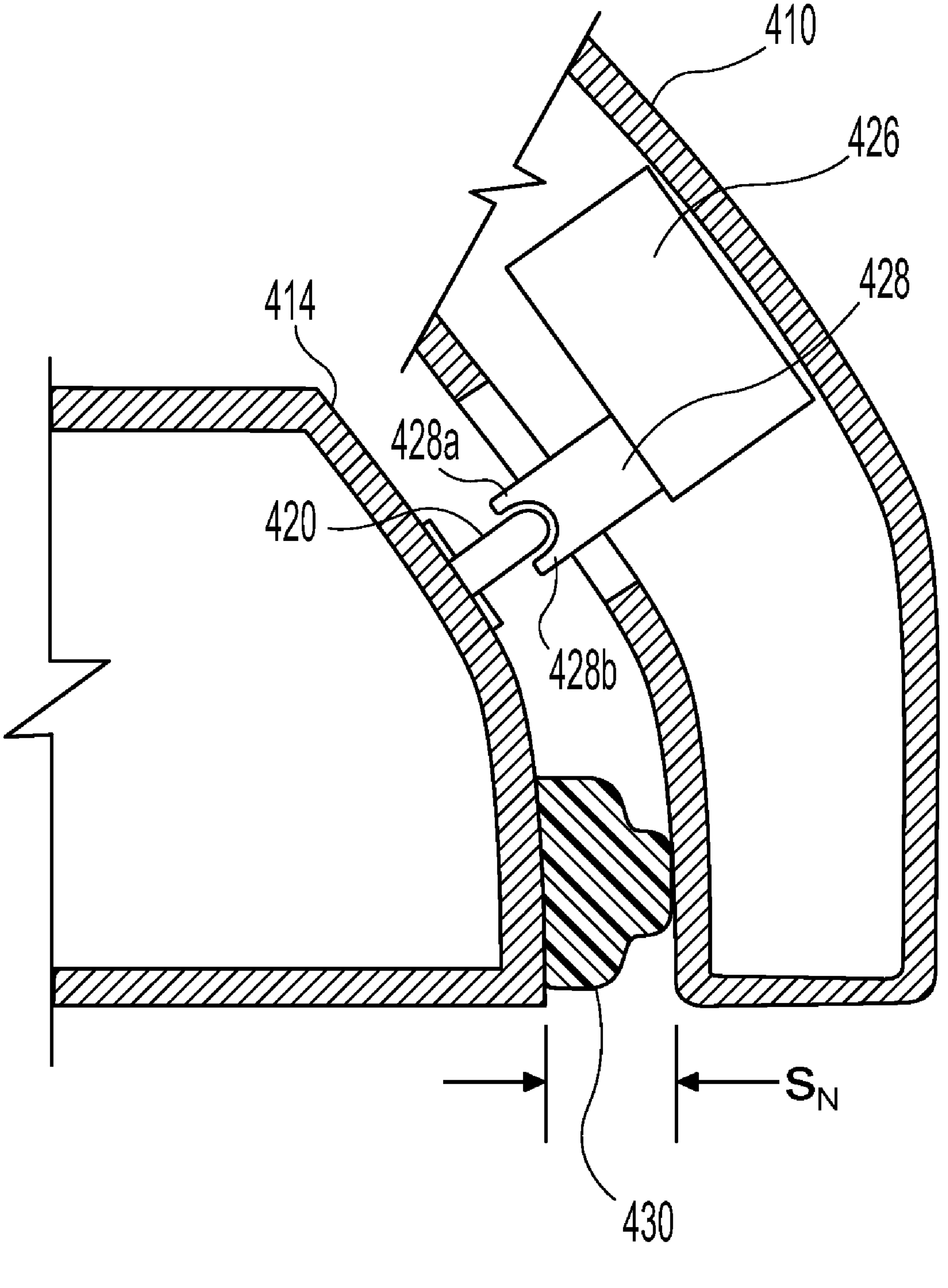
FIG. 11 is a is a partial cutaway side view illustrating the rear portion of a vehicle including a compressible seal with the tailgate in a nominally-closed position.

In an alternative embodiment of the invention shown in FIG. 11, a vehicle has a body with a tailgate 410 pivotably attached to the vehicle at a hinge as in the embodiments described above. A tailgate frame 414 is also part of the vehicle, as is a tailgate opening and closing means, substantially the same as the structures shown and described above. The alternative power tailgate system has a catch 420, which can be a U-shaped metal loop, as is conventional, secured to the tailgate frame 414. A tailgate latching means comprises a latch actuator 426, such as a motor, and a clinch latch 428, which may be a U-shaped body that is rotatably displaced by the latch actuator 426. The latch actuator 426 and the clinch latch 428 are mounted in the tailgate 410. A compressible seal 430 is attached to the tailgate frame 414 or the tailgate 410, and is interposed between the tailgate 410 and the tailgate frame 414.

Figure 12:
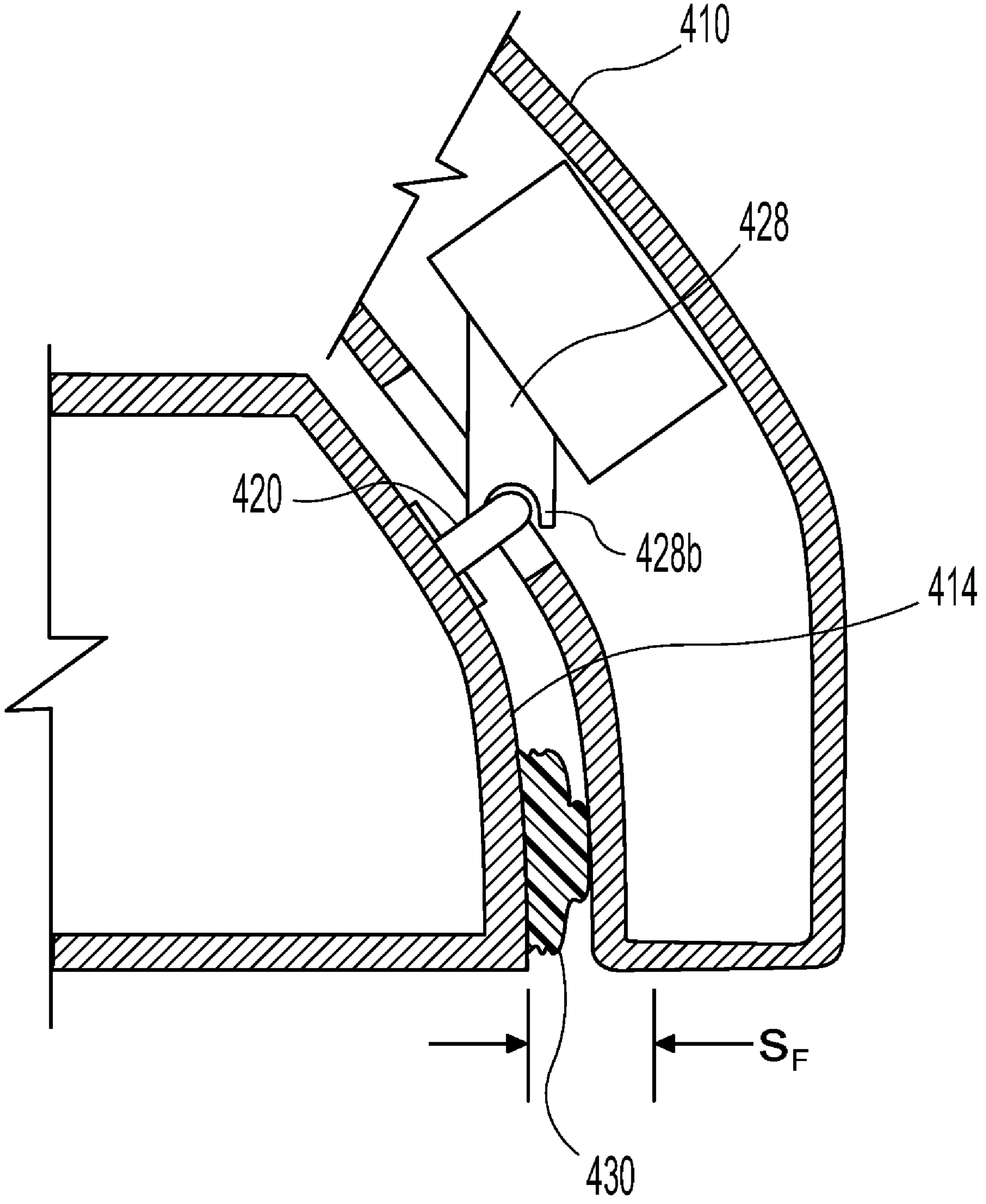
FIG. 12 is a partial cutaway side view illustrating the rear portion of the vehicle of FIG. 11 with the tailgate in a fully-closed position.

A switch is operative to actuate the latch actuator 426 to engage the latch 428 on the catch 420, such as by rotating the latch 428 to extend the leg 428*a* into the opening between the legs of the U-shaped catch 420. This movement traps the base of the U-shaped catch 420 between the legs 428*a* and 428*b* of the latch 428, as shown in FIG. 12. A switch is operative to actuate the latch actuator 426 to apply a drawing force to the catch 420 by rotating the latch 428. When the drawing force is applied, the tailgate 410 is drawn to the over-closed position. A switch is operatively connected to the tailgate latching means 426 and is operative to apply an extension force, which rotates the latch 428 in the opposite direction to the drawing force.

A switch (not shown) controls the closing of the tailgate 410 via the tailgate opening and closing means from a fully-open position. In operation, starting with the tailgate 410 in an open position, the tailgate closing switch is closed and a signal is communicated to the tailgate actuator to move the tailgate 410 to a closed position. Upon reaching a nominally-closed position, $P_N$, (FIG. 11), the tailgate 410 rests on the seal 430, nominally applying a compressing force $C_N$ to the seal 430. The tailgate 410 is nominally separated from the tailgate frame 414 at a separation distance $S_N$. The tailgate latching means 426 causes the latch 428 to engage with the catch 420. In this configuration, the tailgate 410 is closed, but the catch 420 is not latched, nor is the seal 430 significantly compressed.

When the tailgate latching means 426 urges the tailgate 410 toward the fully-closed position, $P_F$, from the nominally-closed position $P_N$ the latch 428, starting in an extended position (shown in FIG. 11), is drawn in a closing direction by the latch actuator 426 rotating the latch 428. As the latch 428 is rotated, it draws the attached tailgate 410 from the nominally-closed position, $P_N$, (FIG. 11) to the fully-closed and latched position, $P_F$, where the seal 430 is further compressed to $C_F$ and the tailgate 410 is separated from the tailgate frame 414 at a separation distance $S_F$ (see FIG. 12). The fully-compressed seal, $C_F$, and tailgate position, $P_F$, is the condition in which the seal 430 is compressed and maintained when the vehicle is in a condition to be driven.

When it is desired to open the tailgate 410 using the alternative embodiment of the invention shown in FIGS. 11 and 12, a switch is closed and the tailgate latching means 426 rotates still further and urges the tailgate 410 from the fully-closed position with a seal compression of $C_F$ to an over-closed position, $P_O$, with a separation distance of $S_O$ and a seal compression of $C_O$. The over-closed position, $P_O$, is accomplished by displacing the tailgate 410 beyond the fully-closed position, $P_F$, to compress the seal 430 beyond the full-compressed state, $C_F$. This is not illustrated, but is analogous to the over-closed position shown in FIG. 3*c*.

Once the over-closed position, $P_O$, is accomplished, the tailgate opening and closing means applies a tailgate-closing force on the tailgate 410. The tailgate 410 is held in this position by the tailgate-closing force and the tailgate latching means 426 is then actuated to rotate the latch 428 in a tailgate-opening direction, which is toward the fully-closed position from the over-closed position. Because the tailgate 410 has been moved beyond the fully-closed position, $P_F$, by the tailgate latching means 426, and held in that position by the tailgate opening and closing means (thereby releasing or reducing the tension on the latch 428 from the elastic force of the compressed seal 430), when a signal from the switch causes the latch 428 to rotate to release the catch 420, the undesirably loud "pop" or "snap" traditionally associated with such disengagement is reduced or eliminated. Additionally, the tailgate 410 does not make an uneven or abrupt motion.

Once the latch 428 is disengaged from the catch 420, the tailgate 410 may then be opened by the tailgate opening and closing means, upon activation of a switch as described above. Thus, the step of over-compressing the seal 430 prior to disengagement of the latch 428 eliminates or significantly reduces the audible and visible result of the sudden release of the potential energy of the compressed seal 430 as with the above-described embodiment. The potential energy is instead released more gradually by the tailgate opening and closing means releasing the compressive force on the seal 430.

Figure 10:
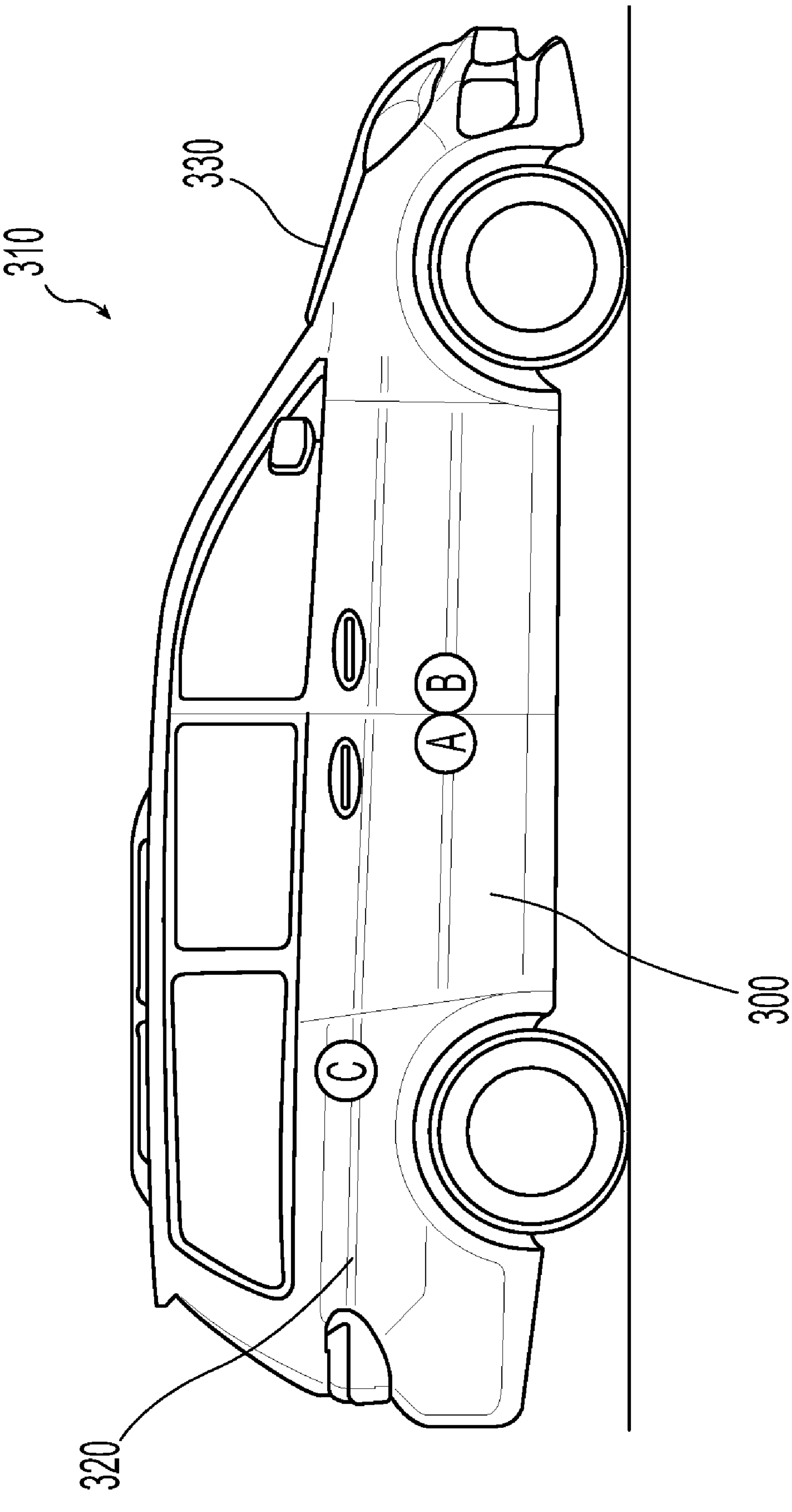
FIG. 10 is a side view illustrating a vehicle with a power sliding door.

It is further contemplated that all of the embodiments of the invention described above can be applied to the opening and closing of a conventional power sliding door, such as those commonly used in minivan applications, in a manner that will be apparent to those skilled in the art. Referring to FIG. 10, for example, the power sliding door 300 of the minivan 310 slides in a conventional manner along a horizontal track 320 in the minivan body 330 between an open position and a nominally-closed position. When in the nominally-closed position, the door 300 can be moved inwardly, towards the vehicle body 330, to a fully-closed position in which the exterior of the door 300 is flush with the exterior of the vehicle body 330 and the door seal (not within view) that lines the door frame is nominally-compressed.

A conventional catch (not within view), similar to the catch 20 in FIG. 1, is mounted within the sliding door 300 at location A. A sliding door latching means (not within view), similar to the tailgate latching means 126 in FIG. 1, is mounted within the door frame at location B for engaging the catch when the door 300 is in the fully-closed position. A sliding door opening and closing means (not within view), similar to the tailgate opening and closing means 116 in FIG. 1, is mounted within the body 330 at location C, and operatively engages the sliding door 300 for moving the door 300 back and forth in the horizontal direction. It is contemplated that the location of the latching means and the catch may be reversed, with the latching means mounted within the door 300 and the catch mounted to the door frame.

Similar to the first embodiment of the invention described above, a first switch is operative to actuate the sliding door opening and closing means to urge the door 300 from a fully-closed position to an over-closed position. A third switch is operative to actuate the opening and closing means to urge the door 300 to open, and is operatively connected to the opening and closing means. A second switch is operative to actuate the latch actuator to disengage the latch from the catch and a fourth switch is operative to actuate the latch actuator to apply a drawing force to the latch. When the drawing force is applied, the door 300 is drawn to the over-closed position. A fifth switch is operatively connected to the door latching means and is operative to apply an extension force, which is in the opposite direction to the drawing force, to the latch.

A switch (not shown) controls the closing of the door via the door opening and closing means from an open position. In operation, starting with the sliding door 300 in an open position allowing access to the interior of the vehicle 310 from outside the vehicle 310, the door closing switch is closed and a signal is communicated to the opening and closing means to move the door 300 to a nominally-closed position. As will be understood by those skilled in the art, the signal to close may be effected via a microcontroller (not shown) with which the door closing switch is in operative connection. Alternatively, the switch may be included within the microprocessor and the closing action initiated with the closing of a single switch in a passenger compartment of the vehicle or from a hand-held wireless device such as a remote control.

Upon reaching a nominally-closed position, $P_N$, the sliding door 300 rests on the door seal, nominally applying a compressing force $C_N$ to the seal. The door 300 is nominally separated from the door frame at a separation distance $S_N$. The latching means causes the latch to engage with the catch. In this configuration, the sliding door 300 is latched, but the door seal is not yet significantly compressed. As will be appreciated by those skilled in the art, it is desirable not to provide power to the door opening and closing means sufficient to drive the door 300 into a fully-closed and latched position, $P_F$, by itself. This can be, for example, because the sliding door opening and closing means cannot provide the force required. Therefore, the door latching means is operative to urge the door into the fully-closed position, $P_F$. As will be further appreciated by those skilled in the art, signals transmitted to the door latching means may also be effected via a microcontroller (not shown). As will be still further appreciated by those skilled in the art, the entire opening or closing step herein described may be initiated by a single physical switch and further switching effected by the microcontroller.

When the sliding door latching means urges the door 300 toward the fully-closed position, $P_F$, from the nominally-closed position $P_N$ the latch, starting in an extended position, is drawn in a closing direction by the latch actuator. As the latch is moved, it thereby draws the attached door from the nominally-closed position, $P_N$ to the fully-closed and latched position, $P_F$, where the door seal is further compressed to $C_F$ and the door 300 is separated from the door frame at a separation distance $S_F$. The fully-compressed seal, $C_F$, and door position, $P_F$, is the condition in which the door seal is compressed and maintained when the vehicle is in a condition to be driven. As will be appreciated by those skilled in the art, $C_F$ is greater than $C_N$ (greater compression force when fully closed) and $S_N$ is greater than $S_F$ (smaller gap when fully closed).

When it is desired to open the sliding door 300, the first switch is closed and the door opening and closing means urges the door 300 from the fully-closed position with a separation distance of $S_F$ and a seal compression of $C_F$ to an over-closed position, $P_O$, with a separation distance of $S_O$ and a seal compression of $C_O$. The over-closed position, $P_O$, is accomplished by displacing the door 300 to a closed position beyond the fully-closed position, $P_F$, to compress the door seal beyond the full-compressed state, $C_F$. As will be appreciated by those skilled in the art, $C_O$ is greater than $C_F$ and $S_F$ is greater than $S_O$. Once the over-closed position, $P_O$, is accomplished the latch is released, such as by displacing the latch laterally in a conventional manner to release the catch. At this point, the sliding door has been moved beyond the fully-closed position, $P_F$, thereby releasing or reducing tension on the latch from the elastic force of the compressed door seal. Thus, when a signal from the second switch causes the latch to disengage from the catch, the undesirably loud "pop" or "snap" traditionally associated with such disengagement is reduced or eliminated. Additionally, the door 300 does not make an uneven or abrupt motion. Once the latch is disengaged, the door 300 may then be opened by the door opening and closing means, upon activation of the third switch as described above, which is a smooth motion. Thus, the step of over-compressing the door seal prior to disengagement of the latch eliminates or significantly reduces the audible and visible result of the sudden release of the potential energy of the compressed door seal. The potential energy is instead released more gradually by the sliding door opening and closing means releasing the compressive force on the door seal.

This detailed description in connection with the drawings is intended principally as a description of the presently preferred and exemplary embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of releasing a door of a vehicle having a door opening and closing means and a door latching means, the door opening and closing means operative to apply an opening force to the door, whereby the door is urged in an open direction, and to apply a closing force to the door, whereby the door is urged in a closed direction, the door latching means operative to move a latch to draw the door from a latched, nominally-closed position, $P_N$, wherein a first portion of the door is proximate to, and is separated by a distance $S_N$ from a first portion of a door frame of the vehicle and wherein the door compresses a compressible seal interposed between the first portion of the door and the first portion of the door frame to a compression $C_N$, to a latched, fully-closed position, $P_F$, wherein the first portion of the door is separated by a distance $S_F$ from the first portion of the door and the door compresses the seal to a compression $C_F$, and wherein the door latching means is operative to move the latch to an unlatched position in which the latch does not engage the door, the method comprising the steps of:

(a) signaling the door opening and closing means to apply a closing force to the door, whereby the door is urged in the closed direction beyond the fully-closed position, $P_F$, to an over-closed position, $P_O$, and the separation distance between the first portion of the door and the first portion of the frame is reduced to $S_O$ and the seal is further compressed to $C_O$; and then (b) signaling the door latching means to move the latch to the unlatched position, whereby the latch moves to the unlatched position and the door is unconstrained by the latch.

2. The method of claim 1, further comprising the step of signaling the door opening and closing means to open the door, whereby the door at least partially opens.

3. The method of claim 1, wherein the door latching means is further operative to move the latch to draw the door from the latched, fully-closed position, $P_F$, to the over-closed position, $P_O$, further comprising signaling the door latching means to apply a drawing force to the door, whereby the door is further urged in the closing direction to the over-closed position, $P_O$.

4. The method of claim 3, further including the step of extending the latch before moving the latch to the unlatched position.

5. The method of claim 2, wherein the steps of signaling the door opening and closing means to apply a closing force to the door, signaling the door latching means to move the latch to the unlatched position, and signaling the door opening and closing means to open the door are initiated from a passenger compartment of the vehicle.

6. The method of claim 2, wherein the steps of signaling the door opening and closing means to apply a closing force to the door, signaling the door latching means to move the latch to the unlatched position, and signaling the door opening and closing means to open the door are initiated from a wireless transmitter.

7. The method of claim 1, wherein the step of signaling the door opening and closing means to apply a closing force to the door further comprises powering the door opening and closing means with motor torque below maximum stall.

8. The method of claim 7, wherein the motor torque is increased until a terminal voltage of a vehicle battery is reached.

9. The method of claim 8, further comprising the step of reducing the power to the door opening and closing means until the door opening and closing means is unpowered.

10. A system, comprising:

(a) a vehicle comprising a body, a door movably attached to the body, the door including a catch secured thereto, and a door frame secured to the body, the vehicle further comprising:

(i) a door opening and closing means connected to the door and to the body of the vehicle, the door opening and closing means adapted to urge the door in an open direction and in a closed direction;

(ii) a door latching means connected to the body of the vehicle, the door latching means comprising a latch secured thereto, the latch adapted to engage the catch; and (iii) a compressible seal interposed between at least a portion of the door and at least a portion of the door frame;

(b) a first switch in operative connection with the door opening and closing means and operative to cause a first signal to be transmitted to the door opening and closing means effective to urge the door from a latched, fully-closed position, $P_F$, wherein a first portion of the door is proximate to, and separated by a distance $S_F$ from a first portion of the door frame, the door compressing the seal to a compression $C_F$, to an over-closed position, $P_O$, wherein the distance is reduced to $S_O$ and the seal is further compressed to a compression $C_O$; and (c) a second switch in operative connection with the door latching means and operative to cause a second signal to be transmitted to the door latching means effective to disengage the latch from the catch, whereby the separation distance remains at substantially $S_O$ and the seal compression remains at substantially $C_O$.

11. The system of claim 10, further comprising a third switch in operative connection with the door opening and closing means and operative to cause a third signal to be transmitted to the door opening and closing means effective to urge the door from the over-closed position, $P_O$, to at least a partially-open position.

12. The system of claim 10, wherein the door latching means is adapted to draw the door from the fully-closed position, $P_F$, to the over-closed position, $P_O$, the system further comprising a fourth switch in operative connection with the door latching means and operative to cause a fourth signal to be transmitted to the door latching means effective to draw the door from the fully-closed position, $P_F$, to the over-closed position, $P_O$.

13. A method comprising the steps of:

(a) signaling a first actuator, the first actuator in operative connection with a door of a vehicle, to apply a closing force to the door when the door is in a first closed position, whereby the door is urged to a second closed position; and (b) signaling a second actuator, the second actuator in operative connection with a door latch, whereby the latch is moved from an engaged to a disengaged position;

wherein a compressible seal is interposed between at least a portion of the door and at least a portion of a door frame of the vehicle and in the first closed position the door compresses the seal to a compression $C_F$ and in the second closed position the door compresses the seal to a compression $C_O$.

14. A method, comprising the steps of:

(a) providing a vehicle having a door with a powered door opening and closing means, the door being moveable in an open direction and a closed direction and engaged in a fully-closed position, $P_F$, by a powered door latching means;

(b) signaling the door opening and closing means to move the door in the closed direction, whereby the door moves to an over-closed position, $P_O$; and (c) signaling the door latching means to disengage the door, whereby the latch disengages the door (d) providing a compressible seal interposed between at least a first portion of a door frame of the vehicle and at least a first portion of the door, wherein when the door is in the fully-closed position, $P_F$, the seal is compressed to a compression $C_F$ and when the door is in the over-closed position, $P_O$, the seal is compressed to a compression $C_O$.

15. The method of claim 14, wherein:

(a) when the door is in the fully-closed position, $P_F$, a distance between a first portion of the door and a first portion of a door frame is $S_F$;

(b) when the door is in the over-closed position, $P_O$, the distance between the first portion of the door and the first portion of the door frame is $S_O$.

16. A method of releasing a door of a vehicle having a door latching means and a door opening and closing means, the door latching means operative to move a latch to draw the door from a latched, fully-closed position, $P_F$, wherein a first portion of the door is proximate to, and is separated by a distance $S_F$ from a first portion of a door frame of the vehicle and the door compresses a compressible seal interposed between the first portion of the door and the first portion of the door frame to a compression $C_F$, to a latched, over-closed position, $P_O$, wherein the first portion of the door is separated by a distance $S_O$ from the first portion of the door frame and the door compresses the seal to a compression $C_O$, wherein the door is constrained in the latched, fully-closed position, $P_F$, and wherein the door latching means is operative to move the latch to an unlatched position in which the latch does not engage the door, the method comprising the steps of:

(a) signaling the door latching means to move the latch to draw the door from the latched, fully-closed position, $P_F$, whereby:

(i) the door is drawn from the latched, fully-closed position, $P_F$, to the latched, over-closed position, $P_O$;

(ii) the separation distance between the first portion of the door and the first portion of the frame is reduced to $S_O$; and (iii) the seal is further compressed to $C_O$;

(b) signaling the door opening and closing means to apply a closing force to the door; and then (c) signaling the latch to move to the unlatched position, whereby the latch moves to the unlatched position and the door is unconstrained by the latch.

* * * * *

UNITED STATES PATENT AND TRADEMARK OFFICE

CERTIFICATE OF CORRECTION

PATENT NO. : 7,874,609 B2
APPLICATION NO. : 12/262251
DATED : January 25, 2011
INVENTOR(S) : Joseph Whinnery It is certified that error appears in the above-identified patent and that said Letters Patent is hereby corrected as shown below:

Col. 11, line 52: insert the word --frame-- after the first occurrence of the word "door"

Signed and Sealed this
Eighth Day of March, 2011

David J. Kappos

*Director of the United States Patent and Trademark Office*